(12) United States Patent
Keohane et al.

(10) Patent No.: US 9,122,867 B2
(45) Date of Patent: Sep. 1, 2015

(54) TECHNIQUES FOR PRESENTING PASSWORD FEEDBACK TO A COMPUTER SYSTEM USER

(75) Inventors: Susann Marie Keohane, Austin, TX (US); Gerald Francis McBrearty, Austin, TX (US); Shawn Patrick Mullen, Buda, TX (US); Jessica Carol Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1492 days.

(21) Appl. No.: 11/759,960

(22) Filed: Jun. 8, 2007

(65) Prior Publication Data

US 2008/0307235 A1 Dec. 11, 2008

(51) Int. Cl.
*G06F 21/00* (2013.01)
*G06F 21/46* (2013.01)

(52) U.S. Cl.
CPC ..................... *G06F 21/46* (2013.01)

(58) Field of Classification Search
CPC ......... G06F 21/60; G06F 21/08; G06F 63/08;
G07F 7/10; H04L 63/08
USPC ......... 705/18; 713/166, 168, 183–186; 726/2,
726/4, 5, 8, 19, 21, 27, 28, 30
See application file for complete search history.

(56) References Cited

U.S. PATENT DOCUMENTS

| | | | |
|---|---|---|---|
| 7,096,503 B1 * | 8/2006 | Magdych et al. | 726/25 |
| 7,451,114 B1 * | 11/2008 | Matsuda et al. | 705/39 |
| 7,506,174 B2 * | 3/2009 | Davis et al. | 713/186 |
| 7,522,060 B1 * | 4/2009 | Tumperi et al. | 340/573.4 |
| 7,552,467 B2 * | 6/2009 | Lindsay | 726/5 |
| 7,581,245 B2 * | 8/2009 | Rojewski | 726/6 |
| 7,594,264 B2 * | 9/2009 | Meyers et al. | 726/21 |
| 7,596,704 B2 * | 9/2009 | Hwang | 713/193 |
| 7,644,042 B2 * | 1/2010 | Ramavarjula et al. | 705/44 |
| 7,716,055 B1 * | 5/2010 | McIntosh et al. | 704/273 |

(Continued)

FOREIGN PATENT DOCUMENTS

| | | |
|---|---|---|
| EP | 1739873 | 1/2007 |
| JP | 2003-086835 A | 7/2003 |
| JP | 2004-334860 A | 11/2004 |

(Continued)

OTHER PUBLICATIONS

Pinkas, B. et al., Securing Passwords Against Dictionary Attacks, CCS '02, pp. 161-170, Nov. 18-22, 2002, Washington, DC, USA.

(Continued)

*Primary Examiner* — Joseph P Hirl
*Assistant Examiner* — Leynna Truvan
(74) *Attorney, Agent, or Firm* — Yudell Isidore PLLC; Steven Bennett

(57) ABSTRACT

A method, system and computer program product for automatically displaying the potential risk associated with cracking a password. While creating or modifying a password, feedback is provided describing the risk associated with cracking the password. Risk assessment may be presented as a percentage, accompanied by an explanation of why the value was ascertained. Risk feedback during password creation provides an opportunity to improve computer, document, and file security.

20 Claims, 6 Drawing Sheets

(56) References Cited

U.S. PATENT DOCUMENTS

2004/0250139 A1 12/2004 Hurley
2005/0198537 A1 9/2005 Rojewski

FOREIGN PATENT DOCUMENTS

JP 2006-133837 A 5/2006
JP 2006-146799 A 6/2006

OTHER PUBLICATIONS

Van Oorschot, PC, et al., On Countering Online Dictionary Attacks with Login Histories and Humans-in-the-Loop, ACM Transactions on Information and System Security, Aug. 2006, pp. 235-258, vol. 9, No. 3.
Baskerville, RL, et al., A Longitudinal Study of Information System that Threats Categories: the Enduring Problem of Human Error, the Data Base for Advances in Information Systems, Fall 2005, pp. 68-79, vol. 36, No. 4.
Bishop et al..; "Improving System Security Via Proactive Password Checking"; Computers & Security; 1995, Elsevier Science Ltd.; pp. 233-249.
J. Hietaniemi; "IPASSWD—Proactive Password Security"; 12449 USENIX Assoc.; Proceedings of the Systems; Adminstration Conference LISA VI; Long Beach, CA; Oct. 19-23, 1992; pp. 105-114.
PCT/EP2008/056438; PCT International Search Report.

\* cited by examiner

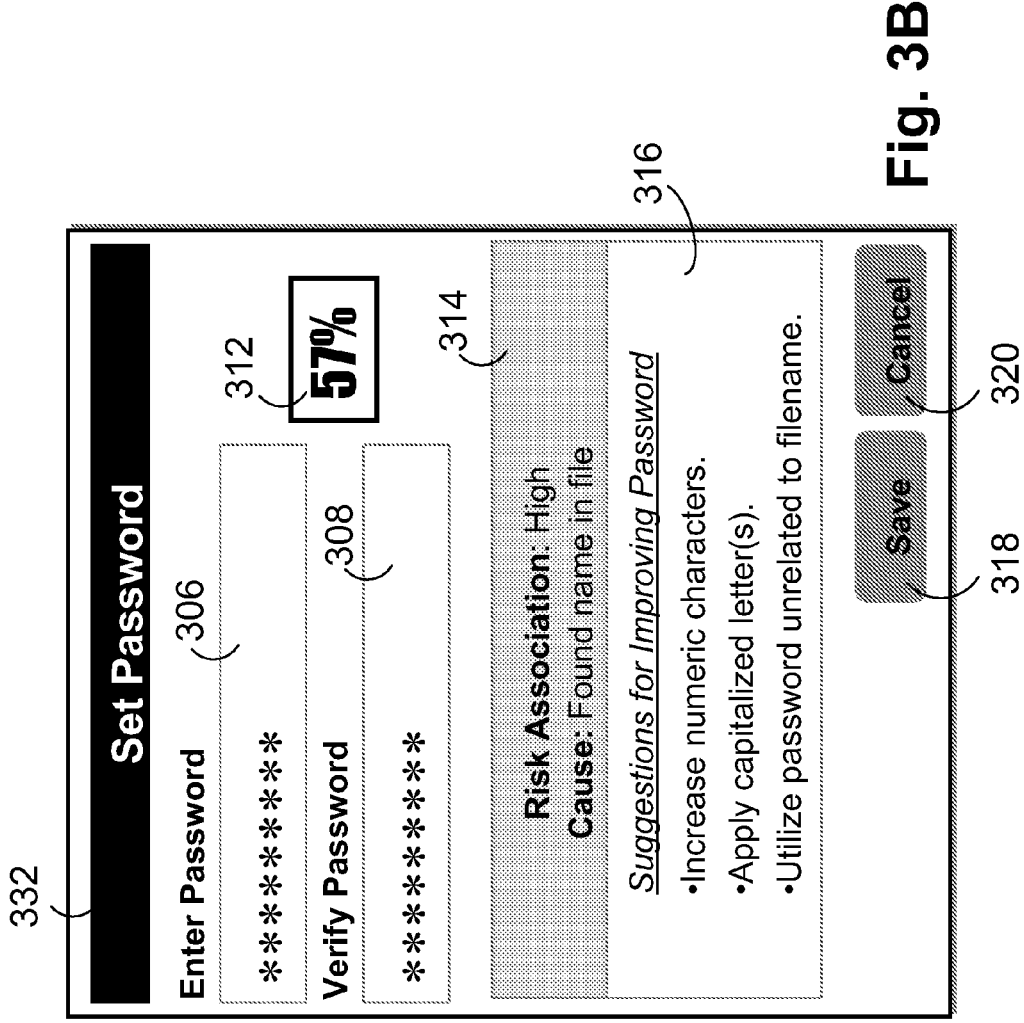

TECHNIQUES FOR PRESENTING PASSWORD FEEDBACK TO A COMPUTER SYSTEM USER

BACKGROUND OF THE INVENTION

1. Technical Field

The present invention generally relates to computer security and in particular to providing computer security utilizing passwords. Still more particularly, the present invention relates to increased password security.

2. Description of the Related Art

With the increase of unwarranted computer system infiltration, or password "cracking" and system "hacking," the need for stronger, more secure, effective passwords is evident. While methods for creating secure passwords have proven to be valuable, breaches in security may increase more rapidly.

Typically, basic rules exist for creating passwords. Many times the user is given certain guidelines to follow when setting or changing a password. For example, the password must (a) be composed of at least six characters, (b) contain numeric and alphabetical characters, (c) not have three identical characters, and (d) have a symbol as one or more characters. Sophisticated password programs double-check created passwords against a dictionary, which screens out proper names or plain text words, and other common character combinations.

Constant password changes are now a staple of computer security. Typical corporate standards dictate that personal passwords must change every 90 days, or so. Many times, users choose a slight modification of an English word as their password. However, people trying to "crack" passwords know that the modification of an English word is a likely occurrence; therefore, cracking programs are altered to manipulate words and perform symbol or number substitutions. Users must be aware of the effectiveness of their created password, in an effort to avoid password cracking.

SUMMARY OF THE ILLUSTRATIVE EMBODIMENTS

Disclosed is a method for providing feedback of the potential risk that a newly created or modified password has of getting cracked. While receiving an entry to create or modify a password, feedback is provided to the user describing the risk associated with the new password in terms of getting cracked. Risk assessment may be presented as a percentage, accompanied by an explanation of why the value was ascertained. Risk feedback during password creation provides an opportunity for users to improve computer, document, and file security.

In one embodiment, a method for reporting feedback of the risk for password cracking is provided. While the password is being set or changed, the risk associated with the potential for deciphering the password is displayed. As the password is created, a password risk manager program executes multiple search procedures and calculations. The password must first satisfy standard password specifications, such as, character length, numeric characters, symbol usage, and others. A password risk assessment program searches files, documents, and emails for pronouns within the file system. The password is compared to words in domestic and foreign dictionaries in plain text, as well as with symbol and numeric letter substitutions.

In another embodiment, the risk assessment program returns an explanation of how the risk for password cracking was determined. For example, if the password is primarily composed of a pronoun utilized within the file system, the potential risk of deciphering would be higher. The risk assessment program would explain that a similar word had been found within the file system, thereby, resulting in an increased likelihood of cracking the password.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 3B illustrates a graphical user interface for setting passwords, with risk percentage and explanation feedback according to one embodiment of the invention;

DETAILED DESCRIPTION OF AN ILLUSTRATIVE EMBODIMENT

The present invention provides a method, system and computer program product for automatically displaying the potential risk of the new password getting cracked, during password creation. While changing or setting a password, feedback is provided to the user, describing the risk associated with the new password in terms of getting cracked in the future. Risk assessment may be presented as a percentage, accompanied by an explanation of why the value was ascertained. Risk feedback during password creation provides an opportunity for users to improve computer, document, and file security.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

The specific numerals assigned to the elements are provided solely to aid in the description and not meant to imply any limitations (structural or functional) on the invention. It is also understood that the use of specific parameter names are for example only and not meant to imply any limitations on the invention. Embodiments of the invention may thus be implemented with different nomenclature/terminology utilized to describe the above parameters, without limitation.

Figure 1:
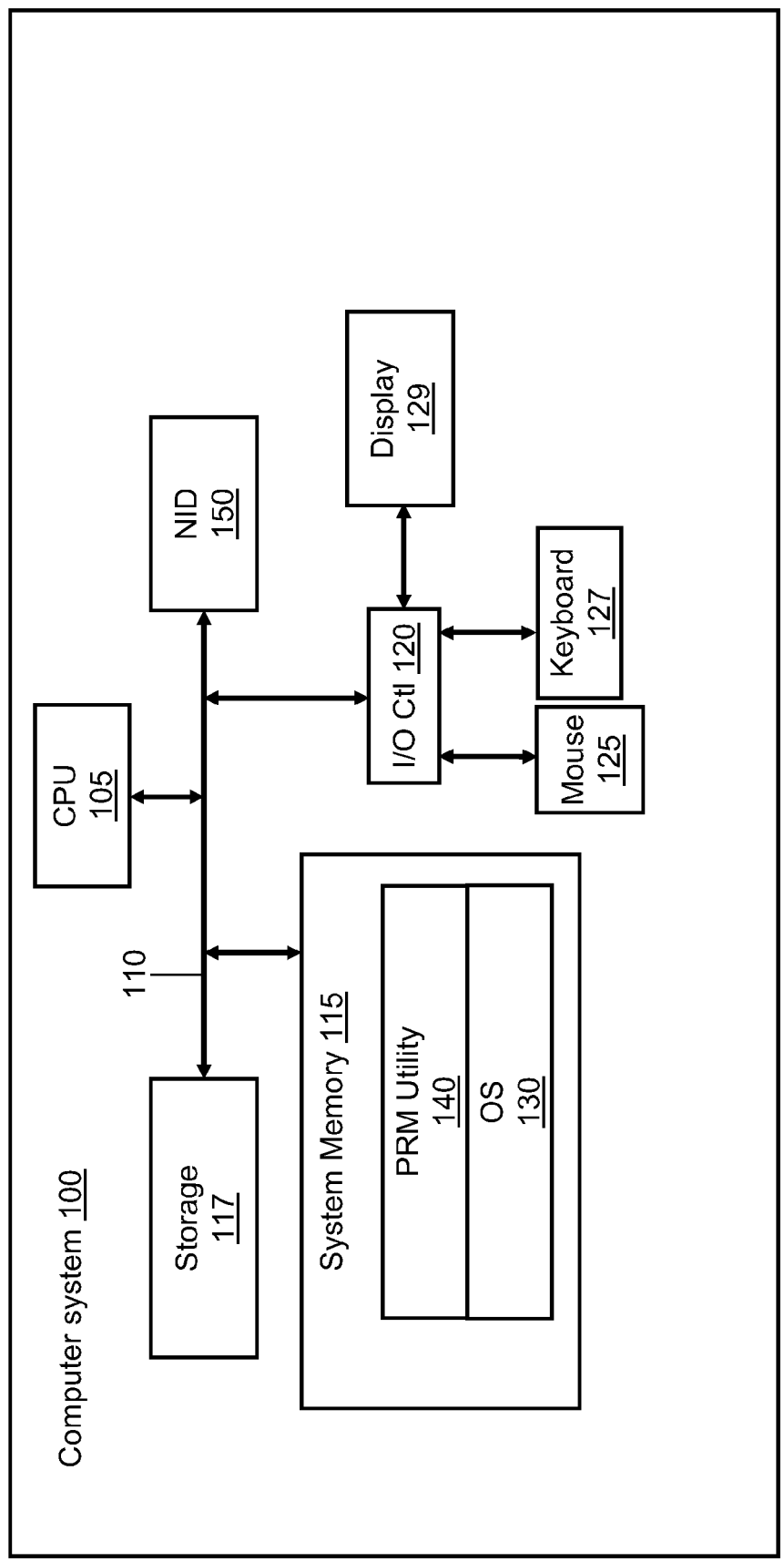
FIG. 1 is a diagram of an example data processing system, utilized to implement an illustrative embodiment of the present invention.

With reference now to the figures, FIG. 1 depicts a block diagram representation of a data processing system within which features of the invention may be advantageously implemented. Computer system 100 comprises a central processing unit (CPU) 105 coupled to system memory 115 via system bus/interconnect 110. Also coupled to system bus 110 is input/output controller (I/O Controller) 120, which controls access by several input devices, of which mouse 125 and keyboard 127 are illustrated. I/O Controller 120 also controls access to output devices, of which display 129 is illustrated. Storage 117 increases the data capacity of computer system 100. In order to support use of removable storage media, I/O Controller 120 may further support one or more USB ports (not specifically shown) and compact disk Read/Write (CDRW)/digital video disk (DVD) drive.

DPS 100 further comprises network interface device (NID) 150 by which computer system 100 is able to connect to and communicate with an external device or network (such as the Internet). NID 150 may be a modem or network adapter and may also be a wireless transceiver device.

Those of ordinary skill in the art will appreciate that the hardware depicted in FIG. 1 may vary. For example, other peripheral devices, such as optical disk drives and the like, also may be used in addition to or in place of the hardware depicted. Thus, the depicted example is not meant to imply architectural limitations with respect to the present invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Various features of the invention are provided as software code stored within system memory 115 or other storage 117 and executed by CPU 105. Among the software code is code enabling the password risk feedback features described below. For simplicity, the collective body of code that enables the password risk feedback features is referred to herein as password risk manager (PRM) utility. In actual implementation, the password risk manager utility may be added to existing operating system (OS) code to provide the password risk feedback functionality described below.

Thus, as shown by FIG. 1, in addition to the above described hardware components, computer system 100 further comprises a number of software components, including operating system (OS) 130 (e.g., Microsoft Windows®, a trademark of Microsoft Corp, or GNU®/Linux®, registered trademarks of the Free Software Foundation and The Linux Mark Institute) and one or more software applications, including PRM utility 140. In implementation, OS130 and PRM utility 140 are located within system memory 115 and executed on CPU 105. According to the illustrative embodiment, when processor 105 executes PRM utility 140, PRM utility 140 enables computer system 100 to complete a series of functional processes, including: (1) password risk assessment; (2) responding to request for secure passwords based on risk assessment; and (3) explanation of risk assessment; and other features/functionality described below and illustrated by FIGS. 2-5.

In one embodiment, a risk assessment software application may be system installed. A password risk assessment application may be installed as a stand-alone application or as an application to enhance a currently operating password system. A database of domestic and foreign plain text words are made available in storage 117, for example, to increase the efficiency of risk assessment. Evaluation of the password is made through the risk assessment application on a server, personal computer, portable handheld computer, or within a client network of computers.

Figure 2:
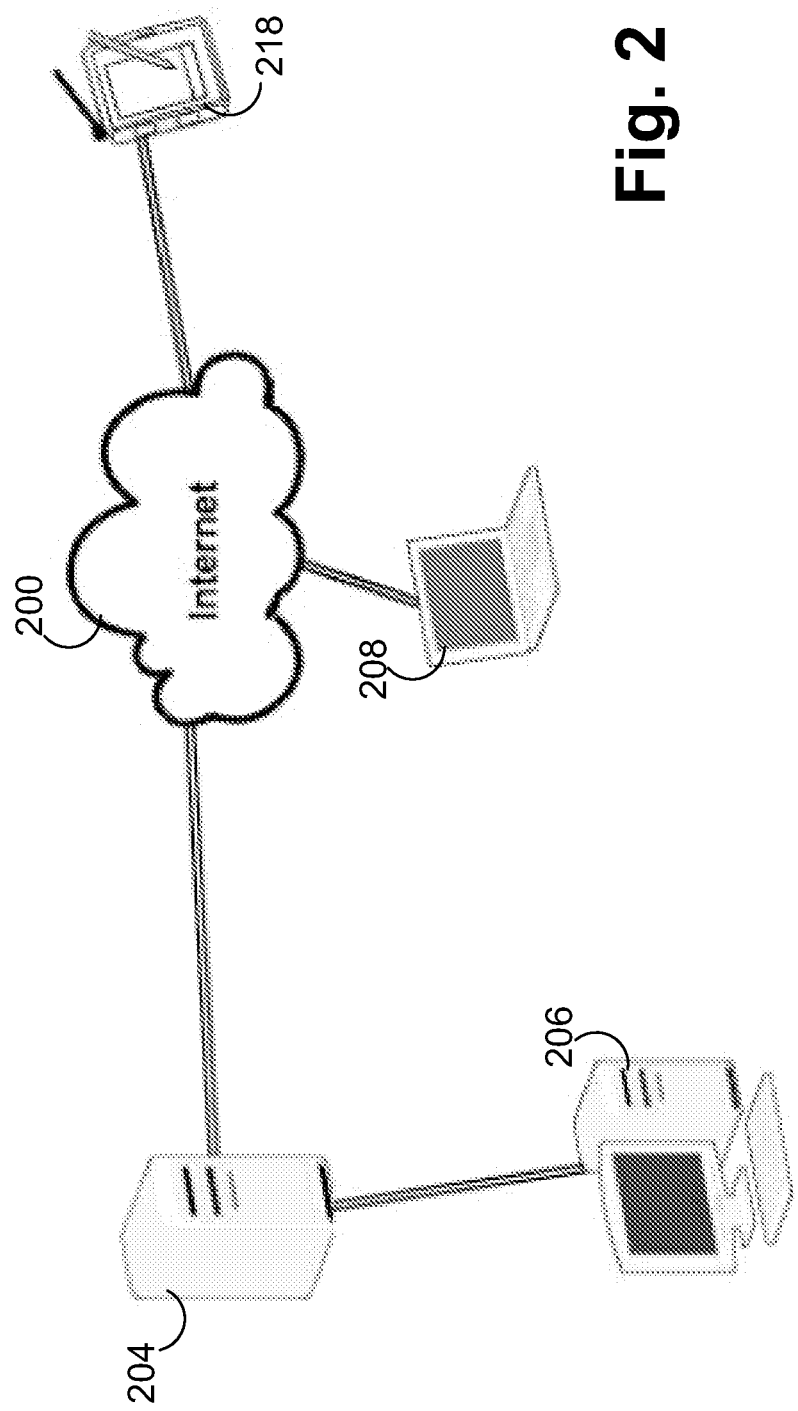
FIG. 2 is a diagram of a network of computers with Internet linked servers in accordance with an illustrative embodiment of the present invention.

FIG. 2 illustrates a computer network in which the password risk assessment application may be implemented. FIG. 2 illustrates a computer network comprising network server 204, computer 206, portable laptop 208, and portable handheld (palmtop) computer 218. Computers 206, 208, and 218 may operate independent of the Internet. Main network server 204 operates as the memory storage location for the dictionary database (including domestic and foreign plain text words), and as a memory storage location for the risk assessment application utilized within the invention. Main network server 204 may assess computer security globally for a primary company, through a password risk assessment application. Alternatively, a password risk assessment application may exist locally on network server 204 to assess potential risk of passwords in an immediate area. Password risk assessment applications may also exist on portable laptop 208, as well as on a portable handheld (palmtop) computer 218 such as the Palm Pilot (manufactured by 3 Com), both of which have Internet access capability.

Those skilled in the art are familiar with agencies that require interlinked network computers. Local server 204 and client group 210 are located in areas of high utilization. Companies with elevated file sharing and documentation contain client computers 212. Client computers 212 are interlinked and share passwords between file systems. Password risk assessment may be performed considering the entire file system of client group 210, or on the file systems of computers 212 independently. Computers 206 and 212 may be similarly configured as data processing system 100.

In one embodiment of the invention, PRM utility 140, of FIG. 1, assesses the potential risk of the created password. Password setup and risk analysis graphical user interfaces (GUIs), illustrated by FIG. 3A and FIG. 3B, are utilized to create and/or modify passwords, display potential risk results, and display suggestions for improvement.

Figure 3A:
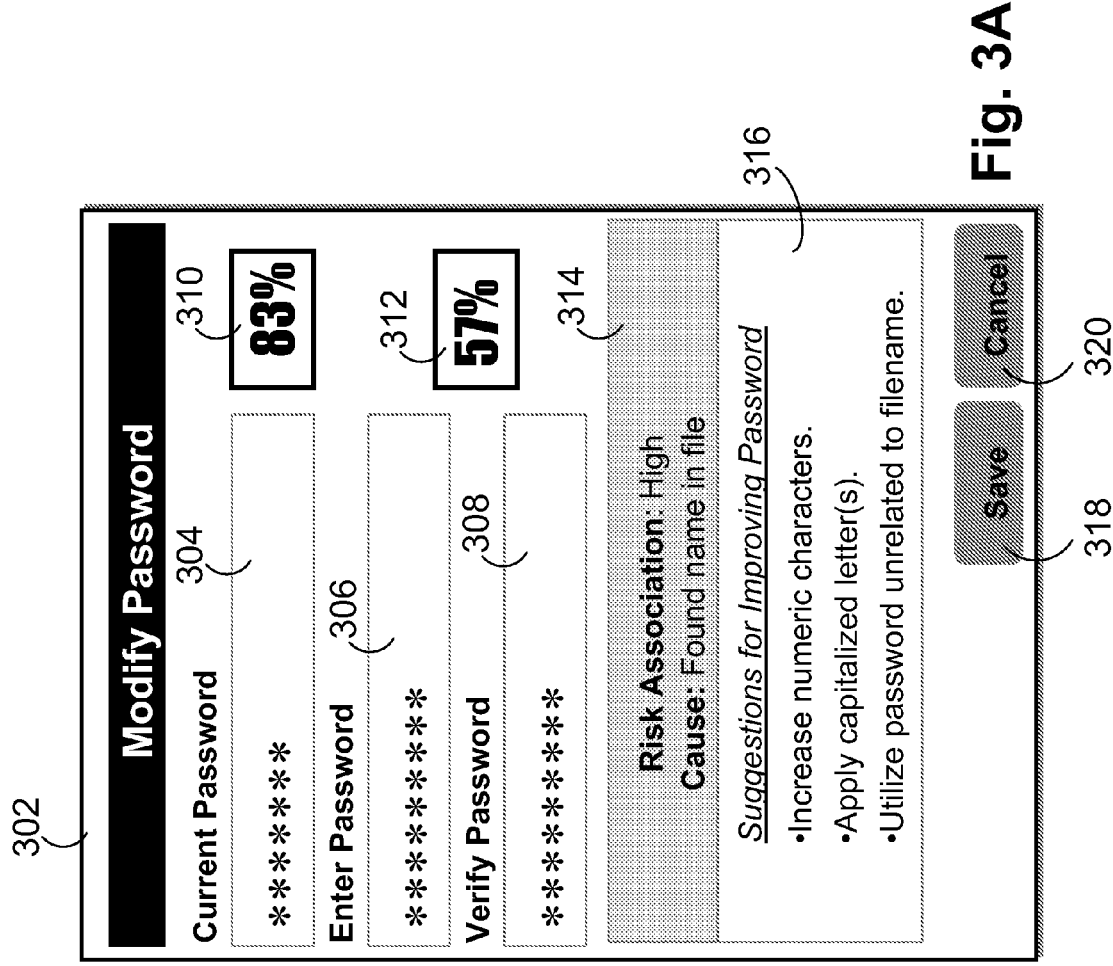
FIG. 3A illustrates a graphical user interface for changing and setting passwords, with risk percentage and explanation feedback according to one embodiment of the invention.

FIG. 3A illustrates risk analysis modify password GUI 302 for modifying a password. Utilizing risk analysis modify password GUI 302, the user first inputs the existing password in current password field 304. PRM utility calculates the risk potential of the current password, and then updates current password risk potential display 310.

In the illustrative embodiment of FIG. 3A, if the password input in current password field 304 is correct, the user may modify the password. To create a password, the user inputs a new password in enter password field 306. PRM utility initiates assessment of the password risk potential; Assessment is not complete until the password is successfully re-entered in verify password field 308. Final risk potential assessment is reported as a percentage in new password risk potential display 312.

In one illustrative embodiment, the risk assessment is displayed in risk report display 314 as low, medium, or high risk potential. An explanation of the potential risk is also displayed is risk report display 314. Suggestion box 316 displays suggestions for improving the created password. The password is saved via save function 318, or the action is cancelled via cancel function 320.

In one embodiment, the user is prompted to enter a different password entry when the level of security risk of the first password entry falls below a pre-set minimum security threshold. The utility detects all changes in the password entry, and automatically adjusts the displayed security risk percentage when changes in the password entry is detected.

In the illustrative embodiment of FIG. 3B, the user may utilize risk analysis set password GUI 332 to set a new password. The password to be created is entered in enter password field 306. PRM utility 140 is activated when a password is entered. New password risk potential display 312 is updated before and after the created password is entered in verify password field 308. The password is saved via save function 318, or the action is cancelled via cancel function 320. In the embodiment illustrated by FIG. 3B, the password risk assessment application is utilized when setting a password for the first time.

Figure 4:
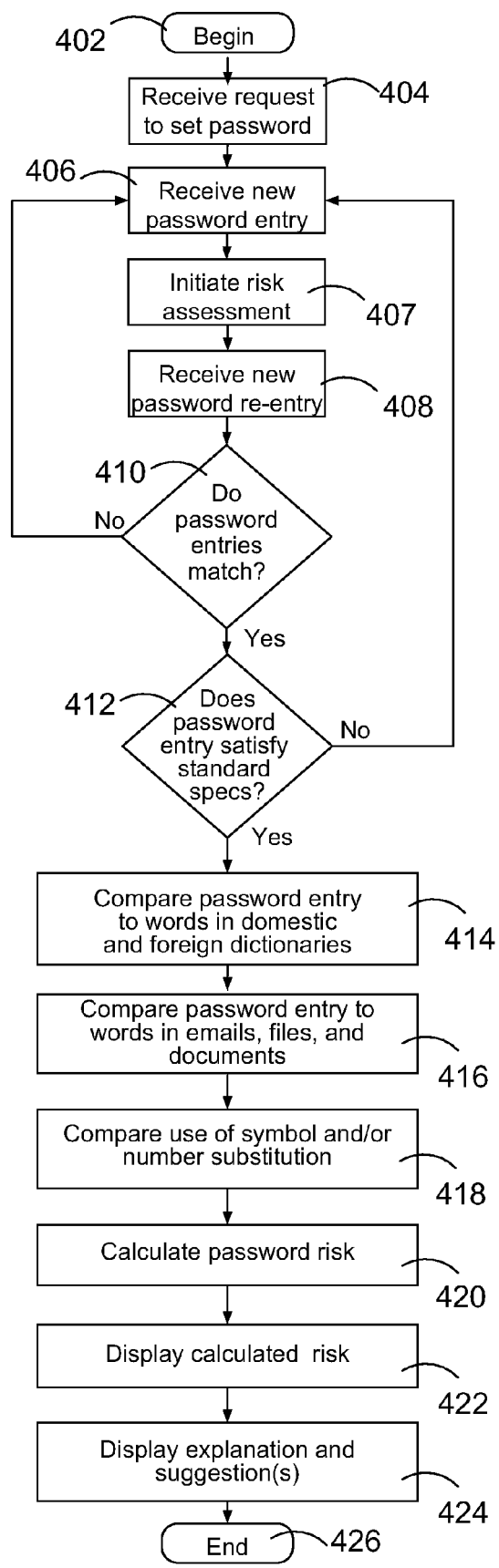
FIG. 4 is a logic flow chart illustrating implementation of password risk manager utility to create a password in accordance with one embodiment of the invention.

FIG. 4 is a flow chart that describes the process of displaying password risk potential while setting a new password. The process begins at step 402, where the PRM utility is initiated. At step 404, the PRM utility receives a request to set a password. Risk analysis set password GUI 332 is displayed, prompting the user to create a password. PRM utility receives the new password entry at step 406. Entrance of a password in the password field initiates the risk assessment program at step 407. To continue risk assessment, the created password must be verified at step 408, by receiving a re-entry of the password.

A determination is made at step 410, whether the password entries match. If the passwords received by the PRM utility do not match, the PRM utility prompts the user to enter the created password again. When the passwords match, a decision is made at step 412, whether the password satisfies the standard specifications. The password entry should satisfy standard specifications, such as, six or more characters, one character numeric, and no identical characters. In this embodiment, if standard specifications are not satisfied, the PRM utility waits for a password entry that satisfies the standard specifications. When the password entry satisfies the standard specifications, risk assessment is initiated at step 414.

At step 414, the created password is compared to words in domestic and foreign dictionaries. Next, the created password is compared to pronouns and words in emails, files, and documents within the file system of interest, at step 416. The pronouns may be accessed through a database that is updated each time a new character combination (e.g., a pronoun or new word) is utilized in an email, file, or document. The database refreshes the contents after a specified time period, such as, every six months. The plain text word, along with letter order and placement may also be evaluated. At step 418, the utilization of symbols and numbers within the created password is assessed. Symbol and number evaluation may also include accessing a database comprising plausible symbol and number substitutions, along with plausible and random character configurations. Potential risk of password cracking is calculated at step 420, and the calculated risk is displayed at step 422. An explanation of the cause for the displayed percentage risk of password cracking is outputted, in addition to suggestion(s) for improving the password, as shown at step 424. The process ends at step 426.

In another embodiment, the arrangement and placement of characters within the password entry is evaluated in determining the level of security (or security risk). Also, when any one of the above checks results in a match of the password entry, (e.g., a match of the password entry within the database of words or with a character combination in the emails, files, and/or documents), the calculation is weighted towards indicating that the password entry has a lower level of security.

Figure 5:
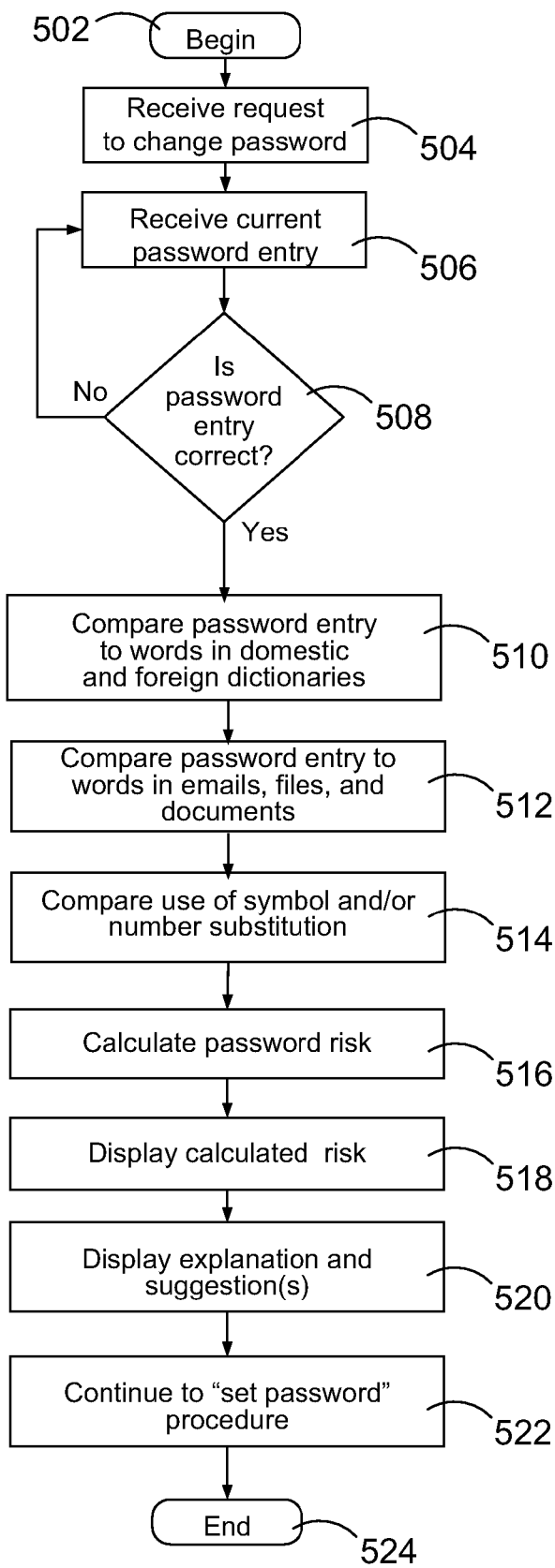
FIG. 5 is a logic flow chart illustrating implementation of password risk manager utility to change a password in accordance with one embodiment of the invention.

FIG. 5 is a flow chart describing the process of displaying the password risk potential when modifying an existing password. The process begins at step 502. The PRM utility receives a request to change a password, at step 504. At step 506, PRM utility receives the entry of the current password. If the current password entry is incorrect, at step 508, the PRM utility waits for a correct entry. After the correct password entry is received at step 508, the PRM utility compares the entry to words in foreign and domestic dictionaries, at step 510.

The created password is compared to pronouns and words in emails, files, and documents within the file system of interest, at step 512. The plain text word, along with letter order and placement may also be evaluated. At step 514, the utilization of symbols and numbers within the created password is assessed. Potential risk of password cracking is calculated at step 516, and the calculated risk is displayed step 518. An explanation of the cause for the risk of password cracking is displayed, in addition to suggestion(s) for improving the password, as provided at step 520. After assessing potential risk of the current password, PRM utility enters the "set password" process, as seen in FIG. 4, at step 522. The process ends at step 524.

In the flow charts above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As a final matter, it is important that while an illustrative embodiment of the present invention has been, and will continue to be, described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method comprising:
    displaying a graphical user interface (GUI) for receiving a plain text entry and providing feedback on the plain text entry;
    detecting, within a new password field of the GUI, a plain text entry comprising a plurality of characters;
    while receiving the plain text entry within the new password field of the GUI:
        dynamically determining a level of security risk associated with the plain text entry in the new password field of the GUI based on words utilized within files of respective file systems associated with the computer system and other computer systems within the same group as the computer system;
        automatically displaying, within the GUI, feedback of the level of security risk associated with the plain text entry, wherein the feedback includes a calculated risk assessment percentage that represents a future risk of the password being cracked, a security risk assessment rating of one of low, medium, and high that is determined according to the calculated risk assessment percentage of the plain text entry, an explanation of the level of security risk with a risk factor cause including an explanation of how the security risk for cracking the plain text entry was determined, and one or more suggestions for improving the level of security risk associated with the plain text entry; and in response to detecting any changes in the plain text entry, automatically adjusting the displayed feedback of the level of security risk associated with the plain text entry; and in response to receiving a selection of a save function within the GUI, saving the plain text entry as a password, wherein the password is one of a new password or a modification to an existing password, wherein the password enables security access to the computer system and the other computer systems within the same group as the computer system.

2. The method of claim 1, further comprising:
calculating a risk potential percentage of a current password for enabling security access to the computer system and the other computer systems within the same group as the computer system;
outputting within the GUI:
the calculated risk potential percentage of the current password;
the feedback of the level of security risk associated with the plain text entry; and
the calculated risk assessment percentage of the plain text entry;
prompting for entry of a different password when the level of security risk associated with the plain text entry falls below a pre-set minimum security threshold;
detecting changes in the plain text entry; and
automatically adjusting the calculated risk assessment percentage while the plain text entry is being changed.

3. The method of claim 1, wherein said dynamically determining further comprises:
evaluating an arrangement and placement of characters within the plain text entry;
comparing the plain text entry with one or more pre-established standard password specifications, which include one or more of: a minimum length of the plain text entry, required numerical and alphabetical content of the plain text entry, non-usage of identical characters within the plain text entry, and usage and non-usage of specific symbols within the plain text entry; and
prompting for modification of the plain text entry when the plain text entry does not satisfy the standard password specifications.

4. The method of claim 1, wherein said dynamically determining further comprises:
accessing a database of domestic and foreign dictionary words;
assessing the level of security risk associated with the plain text entry by comparing the plain text entry to domestic and foreign words within the database; and
evaluating a match of the plain text entry within the database as indicative of a lower security level.

5. The method of claim 1, wherein said dynamically determining further comprises:
accessing a database of saved common character combinations from emails, files, and documents within the computer system, wherein the contents of the database are refreshed after a specified time period;
assessing the level of security risk associated with the plain text entry by comparing the plain text entry to the character combinations in the emails, files, and documents within the computer system; and
evaluating a match of the plain text entry with a character combination in the emails, files, and documents as indicative of a lower security level.

6. The method of claim 1, wherein said dynamically determining further comprises:
assessing the security risk associated with the plain text entry by comparing a use of symbol and number substitution in the plain text entry with pre-established and approved symbol and number substitutions and random configurations of symbols and numbers.

7. The method of claim 1, wherein said dynamically determining further comprises:
receiving a request to change a current password;
opening a second GUI for modifying the current password;
receiving, within the second GUI, an input of the current password to be changed and a new plain text entry; and
outputting a security risk assessment for both the current password and the new plain text entry.

8. The method of claim 1, wherein dynamically determining a level of security risk associated with the plain text entry further comprises:
evaluating placement of at least one letter within the plain text entry;
assessing the utilization of at least one symbol and at least one number within the plain text entry;
evaluating the at least one symbol and the at least one number against a plurality of symbol and number substitutions; and
evaluating the at least one symbol and the at least one number against a plurality of random character configurations.

9. The method of claim 1, wherein the plain text entry is entered into the new password field by a user.

10. A computer program product comprising:
a computer readable storage device; and
program code stored on the computer readable storage device that, when executed by a processor, configures the processor to:
display a graphical user interface (GUI) for receiving a plain text entry and providing feedback on the plain text entry;
receive, in a new password field of the GUI of a computer system, a plain text entry;
prior to saving the plain text entry as a new password:
dynamically determine a level of security risk associated with the plain text entry in the new password field of the GUI based on words utilized within files of respective file systems associated with the computer system and other computer systems within the same group as the computer system;
automatically display, within the GUI, feedback of the level of security risk associated with the plain text entry, wherein the feedback includes a calculated risk assessment percentage that represents a future risk of the password being cracked, a security risk assessment rating of one of low, medium, and high that is determined according to the calculated risk assessment percentage of the plain text entry, an explanation of the level of security risk with a risk factor cause including an explanation of how the security risk for cracking the plain text entry was determined, and one or more suggestions for improving the level of security risk associated with the plain text entry; and in response to detecting any changes in the plain text entry, automatically adjust the displayed feedback of the level of security risk associated with the plain text entry;

in response to receiving a selection of a save function within the GUI, save the plain text entry as a password, wherein the password is one of a new password or a modification to an existing password, wherein the password enables security access to the computer system and the other computer systems within the same group as the computer system.

11. The computer program product of claim 10, wherein the code, when executed by the processor, further configures the processor to:

calculate a risk potential percentage of a current password for enabling security access to the computer system and the other computer systems within the same group as the computer system;

output, within the GUI:
the calculated risk potential percentage of the current password;
the feedback of the level of security risk associated with the plain text entry; and
the calculated risk assessment percentage of the plain text entry;

prompt for entry of a different password when the level of security risk of the plain text entry falls below a pre-set minimum security threshold;

detect changes in the password plain text entry; and automatically adjust the calculated risk assessment percentage while the plain text entry is being changed.

12. The computer program product of claim 10, wherein the code, when executed by the processor, further configures the processor to:

access a database of domestic and foreign dictionary words;

access the level of security risk associated with the plain text entry by comparing the plain text entry to domestic and foreign words within the database; and evaluate a match of the plain text entry within the database as indicative of a lower security level.

13. The computer program product of claim 10, wherein the code, when executed by the processor, further configures the processor to:

access a database of saved common character combinations from emails, files, and documents within the computer system, wherein the contents of the database are refreshed after a specified time period;

access the level of security risk associated with the plain text entry by comparing the plain text entry to the character combinations in the emails, files, and documents within the computer system; and evaluate a match of the plain text entry with a character combination in the emails, files, and documents as indicative of a lower security level.

14. The computer program product of claim 10, wherein the code, when executed by the processor, further configures the processor to:

receive a request to change a current password;
open a second GUI for modifying the current password;
receive, within the second GUI, an input of the current password to be changed and a new plain text entry; and
output a security risk assessment for both the current password and the new plain text entry.

15. The computer program product of claim 10, wherein the code, when executed by the processor, further configures the processor to:

evaluate placement of at least one letter within the plain text entry;

assess the utilization of at least one symbol and at least one number within the plain text entry;

evaluate the at least one symbol and the at least one number against a plurality of symbol and number substitutions; and evaluate the at least one symbol and the at least one number against a plurality of random character configurations;

wherein the plain text entry is entered into the new password field by a user.

16. An electronic device comprising:
a processor component;
an input/output (I/O) mechanism that enables entry of a password into the electronic device;
a mechanism for outputting a security risk associated with the password; and
a utility executing on the processor component and which comprises code that enables the processor component to:

display a graphical user interface (GUI) for receiving a plain text entry and providing feedback on the plain text entry;

receive, in a new password field of the GUI of an electronic device, a plain text entry;

prior to saving the plain text entry as a new password:
dynamically determine a level of security risk associated with the plain text entry in the new password field of the GUI based on words utilized within files of respective file systems associated with the electronic device and other electronic devices within the same group as the electronic device; and automatically display, within the GUI, feedback of the level of security risk associated with the plain text entry, wherein the feedback includes a calculated risk assessment percentage that represents a future risk of the password being cracked, a security risk assessment rating of one of low, medium, and high that is determined according to the calculated risk assessment percentage of the plain text entry, an explanation of the level of security risk with a risk factor cause including an explanation of how the security risk for cracking the plain text entry was determined, and one or more suggestions for improving the level of security risk associated with the plain text entry; and in response to detecting any changes in the plain text entry, automatically adjust the displayed feedback of the level of security risk associated with the plain text entry; and in response to receiving a selection of a save function within the GUI, save the plain text entry as a password, wherein the password is one of a new password, wherein the password enables security access to the electronic device and the other electronic devices within the same group as the electronic device.

17. The electronic device of claim 16, wherein said utility further comprises code that enables the processor component to:

calculate a risk potential percentage of a current password for enabling security access to the computer system and the other electronic devices within the same group as the electronic device;

output, within the GUI:
the calculated risk potential percentage of the current password;

the feedback of the level of security risk associated with the plain text entry; and the calculated risk assessment percentage of the plain text entry;

prompt for entry of a different password when the level of security risk associated with the plain text entry falls below a pre-set minimum security threshold;

detect changes in the password plain text entry; and automatically adjust the calculated risk assessment percentage while the plain text entry is being changed.

18. The electronic device of claim 16, said code for dynamically determining further comprises program code that enables the processor component to:

access a database of domestic and foreign dictionary words, assess the level of security risk associated with the plain text entry by comparing the plain text entry to domestic and foreign words within the database, and evaluate a match of the plain text entry within the database as indicative of a lower security level;

access a database of saved common character combinations from emails, files, and documents within the electronic device, wherein the contents of the database are refreshed after a specified time period, assess the level of security risk associated with the plain text entry by comparing the plain text entry to the character combinations in the emails, files, and documents within the electronic device, and evaluate a match of the plain text entry with a character combination in the emails, files, and documents as indicative of a lower security level; and assess the security risk associated with the plain text entry by comparing a use of symbol and number substitution in the plain text entry with pre-established and approved symbol and number substitutions and random configurations of symbols and numbers.

19. The electronic device of claim 16, wherein said program code for determining further comprises code that enables the processor component to:

receive a request to change a current password;

open a second GUI for modifying the current password;

receive, within the second GUI, an input of the current password to be changed and a new plain text entry; and output a security risk assessment for both the current password and the new password entry.

20. The electronic device of claim 16, said code for dynamically determining further comprises program code that enables the processor component to:

evaluate placement of at least one letter within the plain text entry;

assess the utilization of at least one symbol and at least one number within the plain text entry;

evaluate the at least one symbol and the at least one number against a plurality of symbol and number substitutions; and evaluate the at least one symbol and the at least one number against a plurality of random character configurations;

wherein the plain text entry is entered into the new password field by a user.

* * * * *